United States Patent
Lin et al.

(10) Patent No.: US 6,830,373 B2
(45) Date of Patent: Dec. 14, 2004

(54) TEMPERATURE MEASUREMENT DEVICE

(75) Inventors: Hung-Te Lin, Fengshan (TW); Chung-Nan Chen, Shindian (TW); Chih-Hsiung Shen, Taichung (TW)

(73) Assignee: Opto Tech Corporation, Hsinchu (TW)

( * ) Notice: Subject to any disclaimer, the term of this patent is extended or adjusted under 35 U.S.C. 154(b) by 0 days.

(21) Appl. No.: 10/436,256

(22) Filed: May 13, 2003

(65) Prior Publication Data

US 2004/0066832 A1 Apr. 8, 2004

(30) Foreign Application Priority Data

Oct. 7, 2002 (TW) ........................................ 91123045 A

(51) Int. Cl.$^7$ ............................. G01K 1/16; G01K 1/02; G01J 5/12; G01J 5/16
(52) U.S. Cl. ...................... 374/120; 374/121; 374/208; 374/179; 374/158; 374/133; 374/163
(58) Field of Search ................................ 374/120, 121, 374/132, 133, 135, 163, 158, 208, 179

(56) References Cited

U.S. PATENT DOCUMENTS

| | | | | |
|---|---|---|---|---|
| 2,963,910 A | * | 12/1960 | Astheimer | 374/129 |
| 2,983,888 A | * | 5/1961 | Wormser | 338/18 |
| 3,693,011 A | * | 9/1972 | De Vaux et al. | 250/370.01 |
| 3,742,231 A | * | 6/1973 | Spielberger | 250/338.1 |
| 4,425,504 A | * | 1/1984 | Turnbull et al. | 250/353 |
| 4,456,390 A | * | 6/1984 | Junkert et al. | 374/128 |
| 4,456,919 A | * | 6/1984 | Tomita et al. | 374/132 |
| 4,722,612 A | * | 2/1988 | Junkert et al. | 374/124 |
| 5,056,929 A | * | 10/1991 | Watanabe et al. | 374/181 |
| 5,645,349 A | * | 7/1997 | Fraden | 374/120 |
| 6,076,962 A | * | 6/2000 | Chen | 374/130 |
| 6,435,711 B1 | * | 8/2002 | Gerlitz | 374/130 |
| 6,637,931 B2 | * | 10/2003 | Lee et al. | 374/131 |
| 2003/0016728 A1 | * | 1/2003 | Gerlitz | 374/121 |
| 2003/0118076 A1 | * | 6/2003 | Schieferdecker et al. | 374/121 |

FOREIGN PATENT DOCUMENTS

JP 63109336 A * 5/1988 ............. G01J/5/02

* cited by examiner

Primary Examiner—Gail Verbitsky
(74) Attorney, Agent, or Firm—Rosenberg, Klein & Lee

(57) ABSTRACT

The present invention relates to a temperature measurement device, particularly to a temperature measurement device for the cold junction of a non-contact temperature measurement element, characterized in that a plurality of electrical-conductive pins is provided on the bottom surface of a base. A sensor element for detecting object temperature and a heat-conductive elongated block are provided on the top surface of the base, the heat-conductive elongated block having a sensor element for detecting ambient temperature secured on the top surface thereof, wherein the heat capacity of the sensor element for detecting ambient temperature together with that of the heat-conductive elongated block will approximately be equal to that of the sensor element for detecting object temperature, such that the heat-balance constants of the sensor element for detecting ambient temperature and the cold junction of the sensor element for detecting object temperature will virtually coincide with each other at an abrupt temperature change. Consequently, the dynamic temperature difference between the sensor element for detecting ambient temperature and the cold junction of the sensor element for detecting object temperature may be diminished. In this manner, not only the accuracy of the temperature measurement from the detected object may be raised significantly, but also the sensitivity of the measurement may be maintained effectively.

8 Claims, 5 Drawing Sheets

TEMPERATURE MEASUREMENT DEVICE

FIELD OF THE INVENTION

The present invention relates to a temperature measurement device, particularly to a temperature measurement device for the cold junction of a non-contact temperature measurement element provided for not only increasing the accuracy of the temperature measurement from the detected object significantly, but also remaining the sensitivity thereof.

BACKGROUND

Accordingly, general temperature measurement devices may be substantially divided into contact temperature measurement devices and non-contact temperature measurement devices, wherein the contact temperature measurement devices have being replaced by the non-contact temperature measurement devices gradually due to features including convenience, speediness, accuracy, safety, and human-oriented design of the latter. Thus, the non-contact temperature measurement devices have become mainstream design of the temperature measurement product and been widely used in the ear thermometer, intelligent electric appliance, hazard mitigation, security system, automatic equipment, or remote sensing product.

Referring to FIG. 1, there is shown a conventional non-contact temperature measurement, characterized in that a heat-conductive and electrical-conductive base 13 may have four electrical-conductive pins 19 secured on the bottom side thereof, wherein three of the pins 19 may form element pins 197 electrically isolated from the base 13 by an insulating pad layer 193, and another pin 199 may be connected to the base 13 directly to form a base pin 199 electrically connected with the base 13. Moreover, an infrared temperature-sensing element 15 is secured in place on the top surface of the base 13, and connected to the two of the element pins 197 via a first connecting line 151 and a second connecting line 153, respectively. Furthermore, a thermistor 17 is secured on the other side of the top surface of the base 13. The bottom side of the thermistor 17 may be electrically connected to the base pin 199 via the base 13, and the top side thereof may be electrically to a pin-top 195 of the element pin 197, protruding from the top surface of the base 13, via a third connecting line 171. Additionally, a cap 11 made from a metal material is used to cover and protect the infrared temperature measurement element 15 and the thermistor 17. An area of the cap 11, opposite to a heat-absorption region 155 (hot junction) of the infrared temperature-sensing element 15, is provided with a window filter 115, such that the heat radiation power originated from an external detected object may be directly confronted to and absorbed by the heat-absorption region 155. The area designed for the cold junction is a region of the temperature-sensing element 15 excluding the heat-absorption region 155. Subsequently, the measured heat radiation power is combined with the measured ambient temperature value Ta (provided as the reference temperature value for the cold junction of the infrared temperature-sensing element 15), measured by the thermistor 17, and then the combined result will be transformed into the actual temperature Tb of the detected object.

Referring to FIG. 2, the object of the speediness, convenience, and the safety may be truly achieved by the conventional temperature measurement device. As the ambient temperature changes abruptly, the dynamic temperature-time curve 177 for the thermistor 17 is steeper in comparison with the dynamic temperature-time curve 157 for the infrared temperature-sensing element 15. In other words, the balance time t1 of the thermistor, provided for the reference temperature value for the cold junction of the infrared temperature-sensing element 15, is shorter than the balance time t2 of the actual cold junction of the infrared temperature-sensing element 15 itself, since the volume and the heat capacity of the infrared temperature-sensing element 15 are much larger than those of the thermistor 17. The inevitable difference in heat-balance time not only causes the queried accuracy with respect to the temperature measurement of the detected object, but also reduces the measurement sensitivity significantly.

For this reason, with a large amount of the effort and expense being invested by the industrial, there are attempts to diminish the difference between the heat-balance temperature curves of the thermistor and the cold junction of the infrared temperature-sensing element. The general development aspects are reducing the volume of the infrared temperature-sensing element or increasing the volume of the thermistor. However, if the improvement for reducing the volume of the infrared temperature-sensing element is desired, the signal of the temperature measurement may be deteriorated significantly, resulting in the significant reduction in the measurement sensitivity. On the contrary, if the improvement for increasing the volume of the thermistor is desired, the material of the thermistor and the expenditure thereof both need to be increased considerably.

Thus, providing a novel and efficient improvement construction with the increasing measurement accuracy and sensitivity for obviating disadvantages of the conventional temperature measurement device is critical to the present invention.

SUMMARY OF THE INVENTION

Accordingly, it is a primary object of the present invention to provide a temperature-sensing device diminishing effectively the difference between the temperature-balance curves for the cold junction of the infrared temperature-sensing element and the thermistor for increasing the temperature measurement accuracy of the detected object as the ambient temperature changes.

It is a secondary object of the present invention to provide a temperature measurement device diminishing effectively the difference between the heat capacities of the infrared temperature-sensing element and the thermistor without decreasing the volume of the infrared temperature-sensing element or increasing the volume of the thermistor for remaining the temperature measurement sensitivity.

It is another object of the present invention to provide a temperature measurement device increasing effectively the temperature measurement accuracy and sensitivity of the detected object with the minimum increase in manufacturing cost.

The structural features and the effects to be achieved may further be understood and appreciated by reference to the following description of the presently preferred embodiments together with the accompanying drawings, in which:

DETAILED DESCRIPTION

Figure 3:
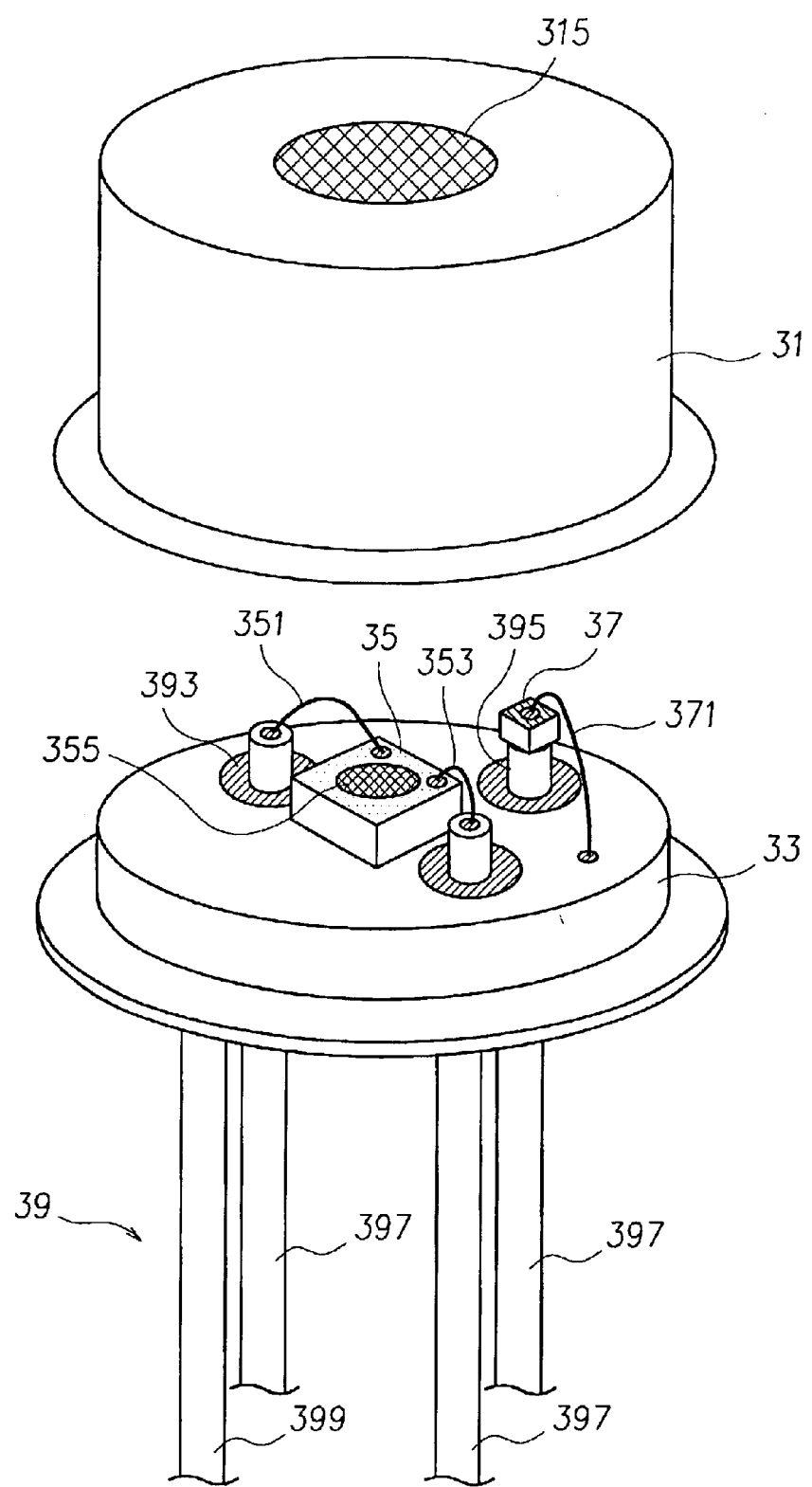
FIG. 3 is a disassembled structural view of a preferred embodiment of a temperature measurement device of the present invention.

Firstly, referring to FIG. 3, a disassembled structural view of a preferred embodiment of a temperature measurement device of the present invention is shown. As could be seen in this figure, a plurality of electrical-conductive pins 39, such as four pins in the present embodiment, is secured to the bottom side of a heat-conductive and electrical-conductive base 33 in the present invention. Three of the four pins 39 are formed as element pins 397 electrically isolated from the base 33 by an insulating pad layer 393, and another pin 399 is connected to the base 33 directly and formed as the base pin 399 electrically connected to the base 33. Pin-tops 395 of the element pins 397 are designed for protruding from the top surface of the base 33 for the convenience of proceeding wiring processes for the element pins 397.

Furthermore, a first temperature-sensing element 35, such as the sensor element for detecting object temperature of the present invention, is secured in place on the top surface of the base 33. This temperature-sensing element, selected from thermopile temperature-sensing elements or pyroelectricity temperature-sensing elements, may be electrically connected to two of the element pins 397 via a first connecting line 351 and a second connecting line 353, respectively.

Furthermore, a second temperature-sensing element 37, such as the sensor element for detecting ambient temperature of the present embodiment, selected from a thermistor, thermocouple, resistance temperature detector (RTD), or solid-state device, as examples, may be secured on the other side of the top surface of the base 33. The second temperature-sensing element may be secured on the top surface of a pin-top 395 of the element pin 397 and electrically connected to the element pin 397, while the top side thereof may be connected to the base 33 by means of a third connecting line 371, allowing electrically connected to the base pin 399 via the base 33.

Furthermore, a cap 31 made from a metal material is used to cover and protect the sensor element for detecting object temperature 35 and the sensor element for detecting ambient temperature 37. An area of the cap 31, opposite to a heat-absorption region 355 of the sensor element for detecting object temperature 35, is provided with a window filter 315, such that the heat radiation power originated from an external detected object may be directly confronted to and absorbed by the heat-absorption region 355. Subsequently, the measured heat radiation power is combined with the measured ambient temperature value Ta (provided as the reference temperature value of the cold junction of the sensor element for detecting object temperature 35), measured by the sensor element for detecting ambient temperature 37, and then the combined result will be transformed into the actual temperature Tb of the detected object.

The temperature value of the sensor element for detecting object temperature 35 is based on the temperature value measured by the sensor element for detecting ambient temperature 37. Additionally, the path of the heat-conduction applied for the ambient sensing element 37 and the cold junction of the sensor element for detecting object temperature 35 may pass through the cap 31, the base 33, and then reach the cold junction of the detected object sensing element 35 and the sensor element for detecting ambient temperature 37, as the ambient temperature changes. As such, in the present invention, instead of secured on the base 33 in the conventional device, the sensor element for detecting ambient temperature 37 is secured on the pin-top 395 protruding from the top surface of the base 33 and isolated from the base 33 by an insulating pad layer 393, such that the path of the heat-conduction applied for the sensor element for detecting ambient temperature 37 may be correspondingly prolonged, and the heat-balance time of the sensor element for detecting object temperature 35 and that of the sensor element for detecting ambient temperature may be correspondingly approached due to the heat-insulation supplied by the insulating pad layer 393.

Figure 1:
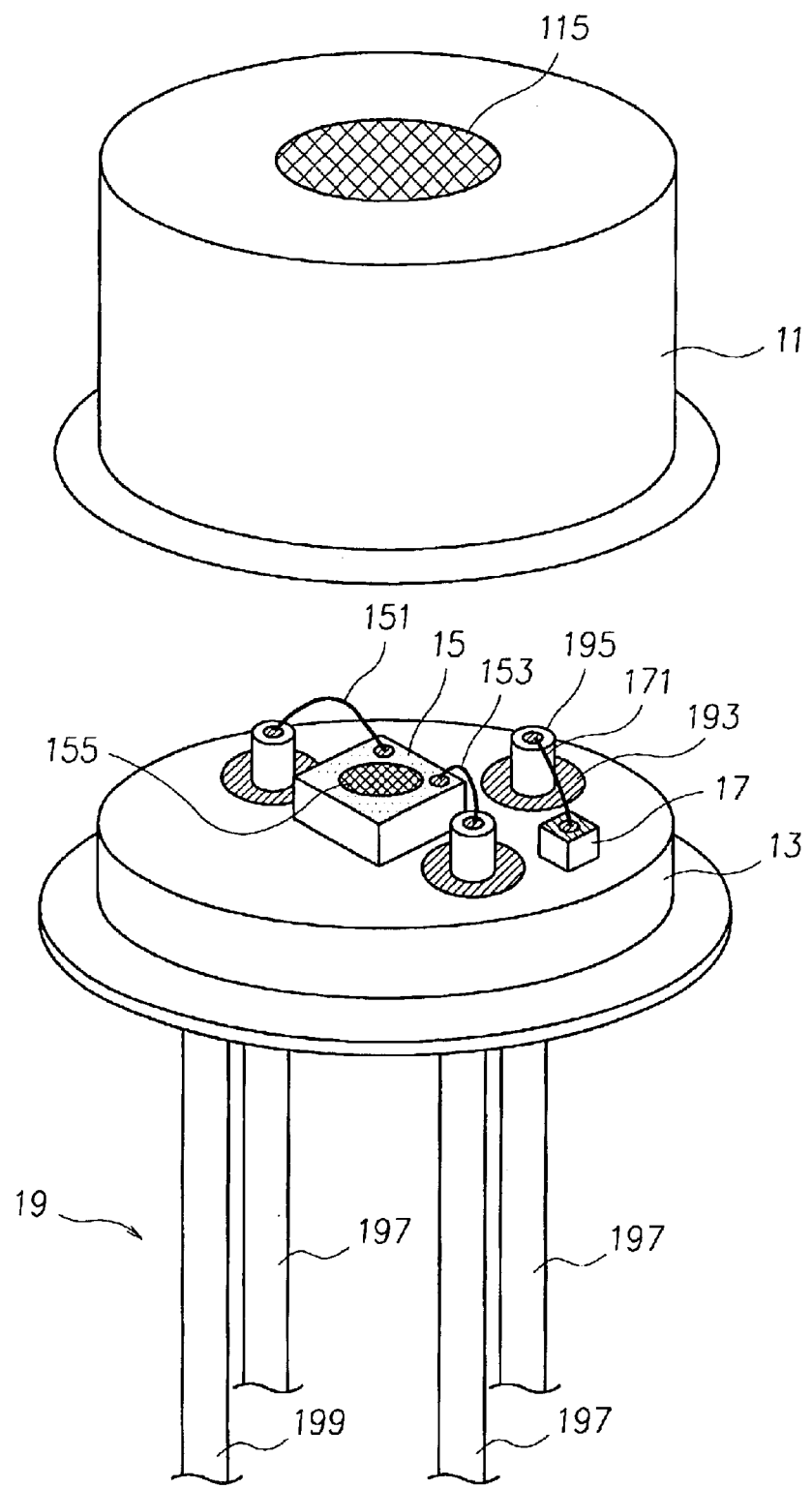
FIG. 1 is a disassembled structural view of a conventional temperature measurement device.
Figure 2:
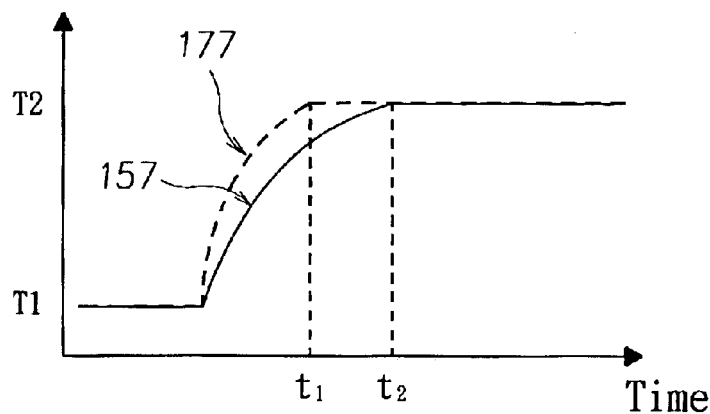
FIG. 2 is a reaction-temperature profile of respective elements of the conventional device.
Figure 4:
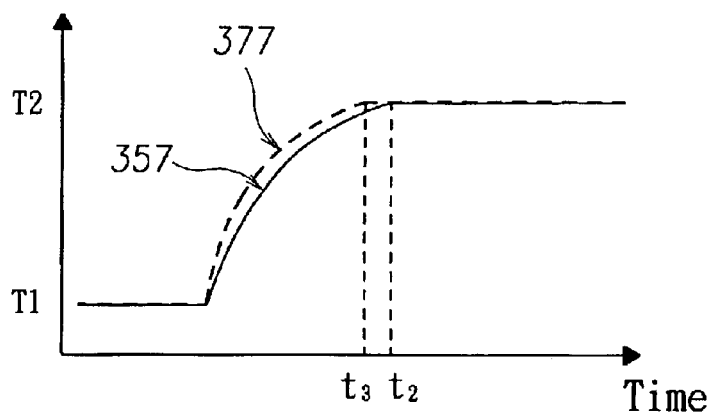
FIG. 4 is a reaction-temperature profile of respective elements of the embodiment of the present invention illustrated in FIG. 3.

Moreover, referring to FIG. 4, a diagram of the reaction-temperature curve for respective elements according to the embodiment illustrated in FIG. 3 is shown. It is clear from the temperature curve 377 of the sensor element for detecting ambient temperature 37 that the heat-balance time t3 is delayed significantly in comparison with the conventional heat-balance time t1 illustrated in FIG. 2. Moreover, the temperature curve 377 and the heat-balance time t3 are closer to the temperature curve 357 and the heat-balance time t2 of the cold junction of the sensor element for detecting object temperature 35, respectively.

The sensor element for detecting ambient temperature 37 providing the reference temperature value Ta for the cold junction of the object-measured sensing element 35 is necessary, since the appropriate approach of the heat-balance time t3 of the sensor element for detecting ambient temperature 37 toward the heat-balance time t2 of the sensor element for detecting object temperature 35 is achieved substantially by the pin-top in the temperature measurement device of the present invention. Thus, the actual temperature value of the cold junction of sensor element for detecting object temperature 35 may be obtained more truly due to the approach of such two heat-balance time, and consequently, the temperature measurement accuracy will be increased significantly. Furthermore, not only the temperature measurement sensitivity could be maintained, but also the expenditure could be controlled effectively, because neither the volume of the detected object sensing element 35 is decreased, nor the volume of the sensor element for detecting ambient temperature 37 is increased.

Figure 5:
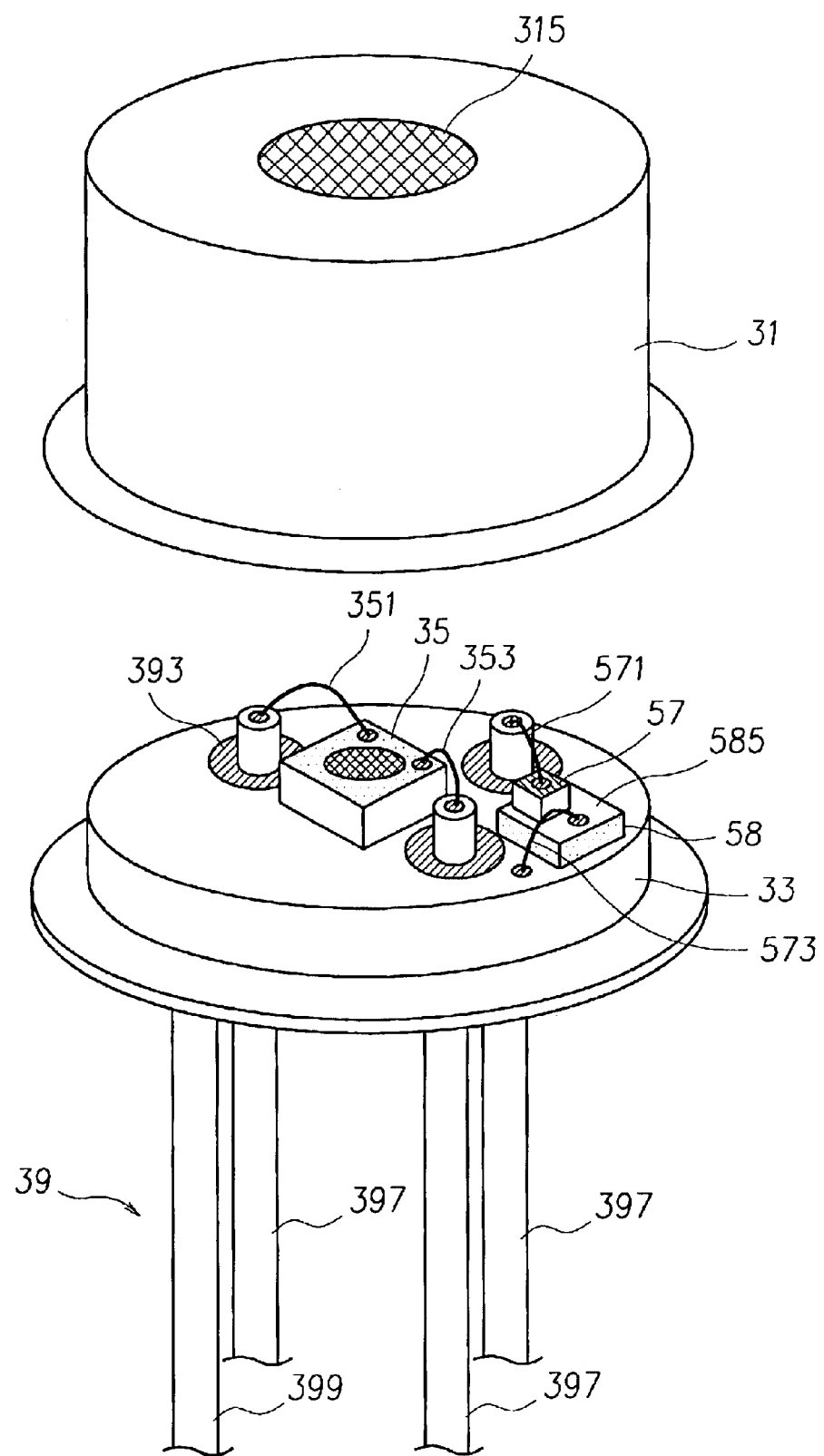
FIG. 5 is a disassembled structural view of an alternative embodiment of the present invention.

In addition, referring to FIG. 5, a diagrammatically disassembled structural view of one embodiment of the present invention is shown. The difference between the above-mentioned embodiment and this embodiment is that the heat-conductive elongated block 58 with an electrical-conductive layer 585 disposed on the top surface thereof may be used, as shown in the figure. The heat-conductive elongated block 58 may be secured in place on the base 33, and in turn, the sensor element for detecting ambient temperature 57 may be secured on the electrical-conductive layer 585 of the heat-conductive elongated block 58. The top side of the sensor element for detecting ambient temperature 57 may be electrically connected to an element pin 397 via a third connecting line 571, and the bottom side thereof may be electrically connected to a base pin 399 via the electrical-conductive layer 585 and the base 33 through a fourth connecting line 573.

Figure 6:
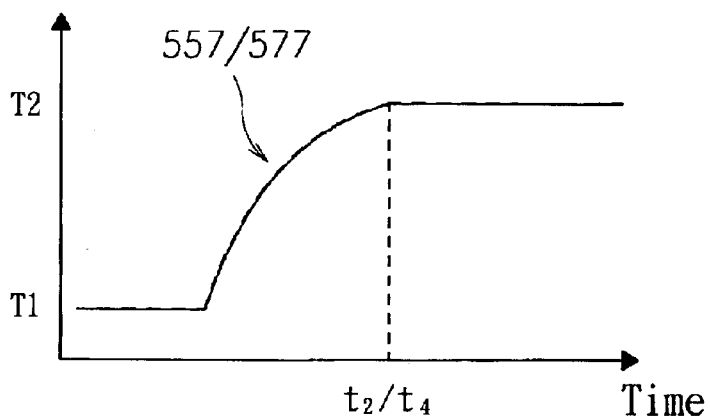
FIG. 6 is a reaction-temperature profile of respective elements of the embodiment of the present invention illustrated in FIG. 5.

In this embodiment, various materials are available for making the heat-conductive elongated block 58, however, it is preferred to select one material capable of cooperating with the sensor element for detecting ambient temperature 57 for causing the summation of the capacity of the heat-conductive elongated block 58 and that of the sensor element for detecting ambient temperature 57 being approximate or equal to that of the sensor element for detecting object temperature 35. In other words, the reaction-temperature curve 557 for the cold junction of the sensor element for detecting object temperature 35 will be further approached toward the reaction-temperature curve 577 for the sensor element for detecting ambient temperature 57, as shown in FIG. 6.

It is clear from the figure that, principally, the reaction-temperature curve 557 for the cold junction of the sensor element for detecting object temperature 35 and the reaction-temperature curve 577 for the sensor element for detecting ambient temperature 57 are considerably coincident with each other, as well as the heat-balance time t4 is also identical to the heat-balance time t2 of the cold junction of the sensor element for detecting object temperature 35. Therefore, it is reasonable to conclude that the actual temperature of the cold junction of the sensor element for detecting object temperature 35 may be principally represented by the reference temperature determined by the sensor element for detecting ambient temperature 57, and correspondingly, the temperature measurement accuracy may be raised effectively.

In this embodiment, the heat-conductive elongated block 58 provided with a electrical-conductive layer 585 disposed on the top surface thereof is based on the assumption that the material of the heat-conductive elongated block must be a good electrical conductor. On the contrary, in an alternative embodiment, the sensor element for detecting ambient temperature 57 may be electrically connected to the base pin 399 directly via the heat-conductive elongated block 58 and the base 33 without the fourth connecting line 573, if the heat-conductive elongated block 58 is made from a good electrical conductor.

Additionally, the base pin 399 capable of being electrically connected to the base 33 directly is also based on the assumption that the base is a good electrical conductor. On the contrary, in an alternative embodiment, the base 33 is designed as a bad electrical conductor, such that all of the pins 39 may be designed for protruding from the top surface of the base 33, and the element may be electrically connected to the corresponding pin 38 via the respective connecting line. Furthermore, the pins 39 may also protrude from the top surface of the base 33 even though the base 33 is a good electrical conductor, however, the electrical isolation between each insulating pad layer 393 and the base 33 is required in this case.

Figure 7:
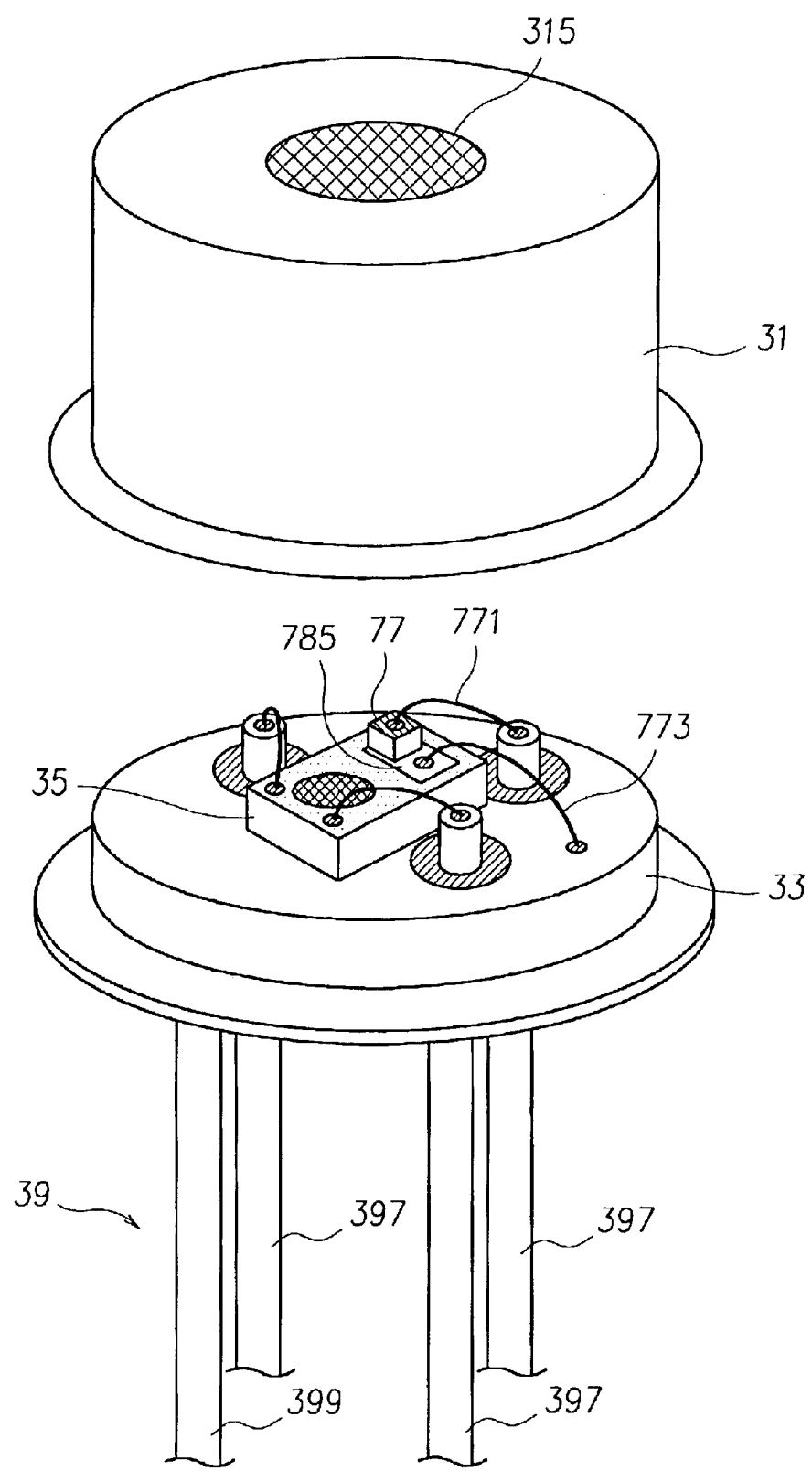
FIG. 7 is a disassembled structural view of an alternative embodiment of the present invention.

Finally, referring to FIG. 7, a disassembled structural view of one embodiment of the present invention is shown. As illustrated in the figure, the difference between this and above-mentioned embodiment is that the sensor element for detecting ambient temperature 77 may be directly secured in place on a part of the surface of the sensor element for detecting object temperature 35 and, of course, an electrical-conductive layer 785 may be inserted between them. A third connecting line 771 is used to electrically connect the top side of the sensor element for detecting ambient temperature 77 with the element pin 397, while the electrical-conductive layer 785, the fourth connecting line 773, and the base 33 are used to electrically connect the bottom side of the sensor element for detecting ambient temperature 77 with the base pin 399. The temperature-balance speed of the sensor element for detecting ambient temperature 77 alone is much higher than that of the cold junction of the sensor element for detecting object temperature 35 alone. Therefore, the design of disposing the sensor element for detecting ambient temperature 77 onto the top surface of the sensor element for detecting object temperature 35 directly could be considered as combining these two elements as a single heat-containing body. In this manner, said two elements may reach the balance state at the same time, as could be seen in the experiment result, illustrated in the reaction-temperature curves of respective elements as shown in FIG. 6. Accordingly, the object and effect of increasing accuracy, maintaining sensitivity, and controlling cost is likewise to be achieved.

To sum up, the present invention relates to a temperature measurement device, particularly to a temperature measurement device for the cold junction of a non-contact temperature measurement element provided for not only increasing the accuracy of the temperature measurement from the detected object significantly, but also remaining the sensitivity thereof. Therefore, since the present invention has satisfied the requirements of patentability, this application is filed in accordance with the patent law duly. Your favorable consideration will be appreciated.

The foregoing description is merely one embodiment of present invention and not considered as restrictive. All equivalent variations and modifications in shape, structure, feature, and spirit in accordance with the appended claims may be made without in any way from the scope of the invention.

What is claimed is:

1. A temperature measurement device comprising:
    a base having a plurality of pins attached to a bottom side thereof, at least one of said pins penetrating through said base, causing pin-tops of said pins protruding from a top surface of said base;
    a first temperature-sensing element secured on said top surface of said base and electrically connected to two of said pins via a first connecting line and a second connecting line, respectively and correspondingly; and
    a second temperature-sensing element secured on said pin-tops protruding from said top surface of said base, and electrically connected to one of said pins correspondingly at least via a third connecting line;
    wherein said first temperature-sensing element is a sensor element with absorbing an external heat radiation power from a detected object, and said second temperature-sensing element is a sensor element for detecting ambient temperature.

2. A temperature measurement device comprising:
    a base having a plurality of pins attached to a bottom side thereof, at least one of said pins penetrating through said base, causing pin-tops of said pins protruding from a top surface of said base;
    a first temperature-sensing element secured on said top surface of said base and electrically connected to two of said pins via a first connecting line and a second connecting line, respectively and correspondingly; and
    a second temperature-sensing element secured on said pin-tops protruding from said top surface of said base, and electrically connected to one of said pins correspondingly at least via a third connecting line;

wherein said first temperature-sensing element is an infrared thermometer, and said second temperature-sensing element is an electronic temperature sensor.

3. A temperature measurement device comprising:

a base having a plurality of pins attached to a bottom side thereof, at least one of said pins penetrating through said base, causing pin-tops of said pins protruding from a top surface of said base;

a first temperature-sensing element secured on said top surface of said base and electrically connected to two of said pins via a first connecting line and a second connecting line, respectively and correspondingly; and a second temperature-sensing element secured on said pin-tops protruding from said top surface of said base, and electrically connected to one of said pins correspondingly at least via a third connecting line;

wherein said first temperature-sensing element is a thermopile sensor, and said second temperature-sensing element is a thermistor.

4. A temperature measurement device comprising:

a base having a plurality of pins attached to a bottom side thereof;

a sensor element for detecting object temperature, secured on a top surface of said base and electrically connected to two of said pins via a first connecting line and a second connecting line, respectively and correspondingly;

a heat-conductive elongated block secured on a part of said top surface of said base; and a sensor for detecting ambient temperature, secured on a top surface of said heat-conductive elongated block and electrically connected to one of said pins correspondingly at least via a third connecting line;

wherein a heat capacity of said sensor element for detecting ambient temperature together with that of said heat-conductive elongated block is approximate to that of said sensor element for detecting object temperature.

5. A temperature measurement device comprising:

a base having a plurality of pins attached to a bottom side thereof;

a sensor element for detecting object temperature, secured on a top surface of said base and electrically connected to two of said pins via a first connecting line and a second connecting line, respectively and correspondingly;

a heat-conductive elongated block secured on a part of said top surface of said base; and a sensor for detecting ambient temperature, secured on a top surface of said heat-conductive elongated block and electrically connected to one of said pins correspondingly at least via a third connecting line;

wherein said pins include at least one element pins electrically isolated from said base by means of an insulating pad layer;

wherein said first connecting line and said second connecting line of said sensor element for detecting object temperature are electrically connected to said corresponding element pins, respectively, said sensor element for detecting ambient temperature electrically connected to a corresponding base pin via said heat-conductive elongated block and said base, and said third connecting line connected to another corresponding element pin.

6. A temperature measurement device comprising:

a base having a plurality of pins attached to a bottom side thereof;

a sensor element for detecting object temperature, secured on a top surface of said base and electrically connected to two of said pins via a first connecting line and a second connecting line, respectively and correspondingly;

a heat-conductive elongated block secured on a part of said top surface of said base; and a sensor for detecting ambient temperature, secured on a top surface of said heat-conductive elongated block and electrically connected to one of said pins correspondingly at least via a third connecting line;

wherein said heat-conductive elongated block is made from a material selected from a conductor, a non-conductor, and a combination thereof, said top surface of said heat-conductive elongated block being provided with an electrical-conductive layer electrically connected to one of said pins correspondingly via a fourth connecting line.

7. A temperature measurement device comprising:

a base having a plurality of pins attached to a bottom side thereof;

a sensor element for detecting object temperature, secured on a top surface of said base and electrically connected to two of said pins via a first connecting line and a second connecting line, respectively and correspondingly;

a heat-conductive elongated block secured on a part of said top surface of said base; and a sensor element for detecting ambient temperature secured on a top surface of said heat-conductive elongated block and electrically connected to one of said pins correspondingly at least via a third connecting line;

wherein a part of a surface of said sensor element for detecting object temperature is provided with an electrical-conductive layer electrically connected to one of said pins correspondingly via a fourth connecting line, said sensor element for detecting ambient temperature being secured on said electrical-conductive layer.

8. The temperature measurement device according to claim 7, wherein said pins include at least one element pins electrically isolated from said base by means of an insulating pad layer, and wherein said first connecting line and said second connecting line of said sensor element for detecting object temperature are electrically connected to said corresponding element pins, respectively, and said sensor element for detecting ambient temperature is electrically connected to a corresponding base pin via said electrical-conductive layer, said fourth connecting line, and said base, as well as said third connecting line is connected to another corresponding element pin.

* * * * *